United States Patent
Le Febvre, Jr.

[15] 3,698,192
[45] Oct. 17, 1972

[54] UNIVERSAL JOINT EMPLOYING A FLUID BEARING FOR A MOVABLE NOZZLE

[72] Inventor: Clarence A. Le Febvre, Jr., San Jose, Calif.

[73] Assignee: United Aircraft Corporation, East Hartford, Conn.

[22] Filed: June 22, 1970

[21] Appl. No.: 48,203

[52] U.S. Cl............60/232, 239/265.35, 248/358 R
[51] Int. Cl...............................................F02k 1/24
[58] Field of Search........60/228, 229, 230, 231, 232, 60/242, 39.31; 239/265.19, 265.35

[56] References Cited

UNITED STATES PATENTS

| | | |
|---|---|---|
| 3,143,354 | 8/1964 | Newcomb......239/265.35 UX |
| 3,401,887 | 9/1968 | Sheppard.................60/232 X |
| 3,446,437 | 5/1969 | McCullough.........239/265.35 |

*Primary Examiner*—Clarence R. Gordon
*Attorney*—Steven F. Stone

[57] ABSTRACT

A universal joint permitting the relative axial angular deflection of two members comprises a receptacle in one of said members, a plug on the other of said members received in said recess and spaced apart therefrom, rolling seal means between the periphery of said receptacle and the periphery of said plug and a fluid filling the volume between the plug member, the seal means and the receptacle. Such a seal is particularly useful for permitting the relative angular deflection of two members which are subjected to loads tending to force the members towards each other such as are encountered, for example, in a reaction motor employing a movable nozzle where the blow-out loads on the nozzle tend to force the movable nozzle against the fixed nozzle support structure. This joint, with the receptacle, plug and seal means in annular form, is a lightweight, reliable, load bearing universal joint and nozzle seal which requires relatively low actuating forces.

18 Claims, 12 Drawing Figures

INVENTOR.
CLARENCE A. LE FEBVRE JR
BY
ATTORNEY

INVENTOR.
CLARENCE A. LE FEBVRE JR

UNIVERSAL JOINT EMPLOYING A FLUID BEARING FOR A MOVABLE NOZZLE

BACKGROUND OF THE INVENTION

There are many applications in which two members must be connected together in such a way that the relative axial angular orientation of the members with respect to each other can be varied. Such applications range from simple toys, such as balancing boards, for example, through flexible pipe joints and torque transmitting mechanisms associated with the drive trains of vehicles, tools or other machines, for example, to such complex devices as the movable nozzle assemblies used in reaction motors in which directional control is obtained by changing the angular orientation of the axis of the exhaust nozzle with respect to the axis of the motor itself. In the past, universal joints permitting the axial deflection of two members have typically utilized various mechanical linkages involving pins, sleeves, bearings, balls and sockets of numerous designs, or employed structures which underwent a physical deformation upon deflection. While such universal joints are quite satisfactory for many applications, they tend to be unsatisfactory in situations where, in addition to a side moment tending to deflect the angular axial orientation of the members, the members are also subject to other loads such as, for example, loads tending to push the members together or to pull them apart. In such situations, these additional forces produce undesirable wear on the various moving surfaces of the joints which contact each other or tend to increase the moment required for actuation.

Copending, coassigned U.S. Pat. application, Ser. No. 48,356, filed June 22, 1970, of Stephen A. Martin for "Universal Joint Employing a Fluid Bearing," discloses a universal joint in which fluid supported membrane means are disposed between two relatively movable members, which membrane is deformed when relative angular axial deflection of the members occurs. The use of such a fluid supported membrane as a deformable, load bearing member in a universal joint overcomes many of the problems associated with the prior art mechanical universal joints. According to this invention, I have developed certain improvements in universal joints employing fluid supported membrane means which result in a substantial reduction in the actuating force required to obtain axial deflection of the two members while permitting the joint to be operated under substantial loads tending to force the two members together without the mechanical wear associated with prior art joints and without requiring an extremely thick and difficult to deform bladder. While the joint structure is most particularly adaptable in situations in which there is a substantial force tending to force the two relatively movable members together; by appropriate design modifications, the joint of this invention can also be used in circumstances in which there is no axial load or in which there is an axial load component tending to move the first and second members apart. The joint of this invention is usable in a wide variety of applications wherein a reliable, lightweight, load bearing joint requiring a relatively low force for actuation is desired. These desirable features of the invention render it particularly suitable for use as a load bearing joint and seal interposed between a movable nozzle and a fixed nozzle support in reaction motor systems employing movable nozzles for directional control.

It is accordingly an object of this invention to provide a universal joint employing fluid supported membrane means.

It is another object of this invention to provide a universal joint requiring low actuating torque.

It is another object of this invention to provide a universal joint which is capable of functioning under substantial axial compressive loads.

It is another object of this invention to provide a joint for the movable nozzle of a reaction motor.

These and other objects of this invention will be readily apparent from the following description with reference to the accompanying drawings wherein:

DESCRIPTION OF THE INVENTION

Broadly stated, this invention contemplates a universal joint structure for interconnecting two members in such a manner that the relative axial alignment of the members may be angularly deflected. This invention contemplates a receptacle means on one of the members adapted to receive, in spaced apart relation therefrom, a plug element formed on the other of said members. Rolling seal means are provided between the periphery of the receptacle and the periphery of the member and the volume defined between the receptacle and the rolling seal means and the plug is filled with a fluid, the escape of which between the plug and the receptacle is prevented by the rolling seal means. The term "rolling seal means" as used herein defines a membrane which, in the space between the receptacle and the plug, is provided with a convolution of greater than 90° (and preferably equal to 180°) and which, upon relative axial movement of a portion of the plug wall with respect to the immediately adjacent portion of the receptacle wall, rolls onto or off of the adjacent surfaces of the receptacle and plug walls.

Figure 1A:
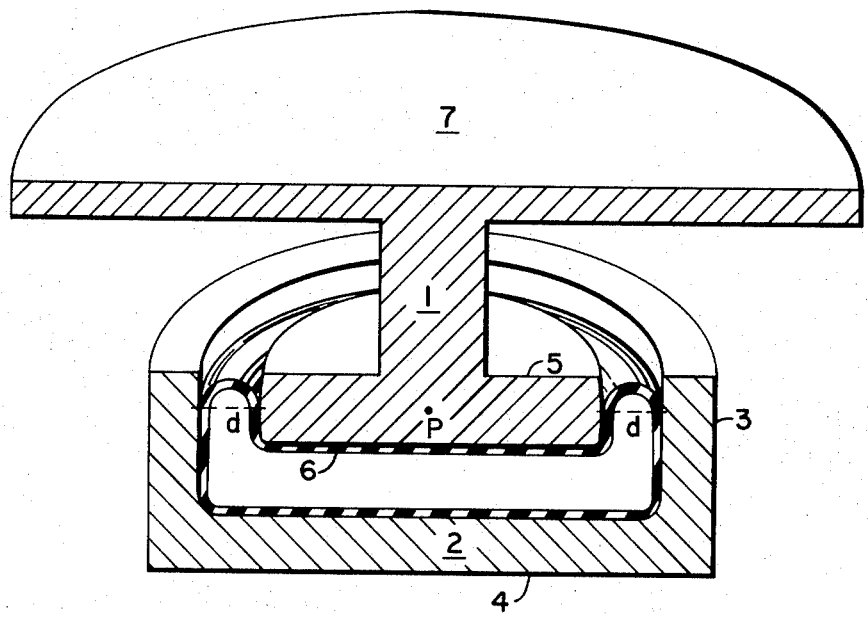
FIGS. 1a and 1b are side sectional views through an embodiment of this invention.
Figure 1B:
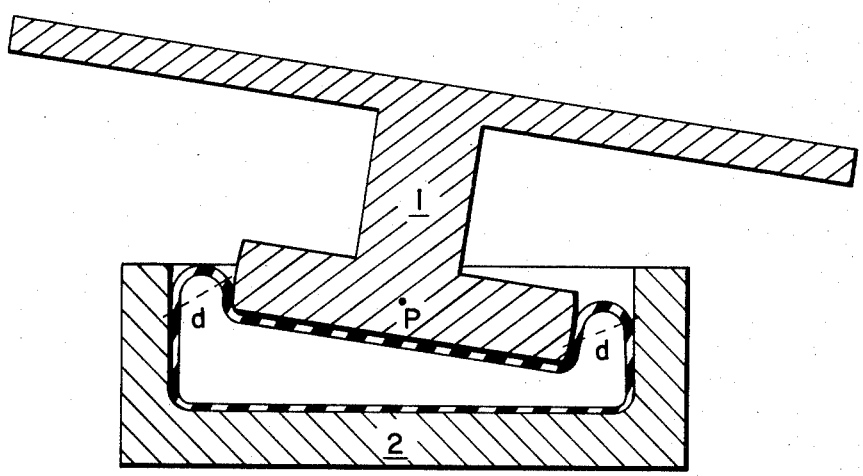

Referring now to FIGS. 1a and 1b, a simple embodiment of this invention is shown. This embodiment consists of first and second relatively movable members 1 and 2 respectively. Member 2 is provided with a receptacle in the form of a cylindrical recess defined by wall 3 and base 4. Member 1 is provided with a cylindrical plug 5 which is smaller in external diameter than the internal diameter of the recess in member 2. Plug 5 is maintained in concentric orientation within the recess in member 2 by fluid supported membrane 6 in the form of a fluid filled bladder which, in the space between plug 5 and wall 3, is convoluted to constitute a rolling seal means between the surfaces of wall 3 and plug 5.

This invention contemplates the use of various fluids including gases and liquids or combinations thereof to fill the volume in the recess behind the rolling seal means. In applications where the operating conditions of temperature and pressure are precisely known and in which a lightweight seal is desirable, it may be preferable to utilize a gas as the fluid. A liquid, however, is usually preferred as the fluid since a given mass of a liquid has a relatively constant volume over substantial variations in temperature and pressure and the use of a liquid results in a substantial simplification in the design of the joint. Suitable liquids include water, alcohols such as the aliphatic alcohols, and glycols, lubricating oils and greases of varying viscosities. In addition, the fluid can be self sealing or contain buoyant plugs to seal leaks in the bladder. Basically, almost any fluid can be used provided it is relatively stable and relatively nonreactive chemically with the other elements of the joint which may contact the fluid. The choice of a particular liquid should, of course, be consonant with the operating requirements of the device. Water, for example, would be suitable for a device which would not be subject to extremes of temperature. Low freezing and high boiling liquids such as ethylene glycol or various types of oils would be suitable where greater extremes of temperature are encountered. In addition, the viscosity of the fluid can be a parameter for selection; low viscosity liquids such as water or ethanol provide for easier actuation whereas higher viscosity liquids tend to provide an oscillation damping effect on the joint which may, in some cases, be desirable.

It should also be noted that while FIG. 1 shows fluid support membrane 6 as a bladder which encloses the entire volume of the recess, the membrane 6 need not completely enclose the fluid. The only design requirement is that a sufficient amount of membrane be present to confine the fluid and to provide rolling seal means between the plug means and the receptacle means at all design extremes of angular deflection of the joint.

To illustrate the operation of the joint, the apparatus of FIG. 1 could be considered to be a simple balance board type exercising device in which a person would stand upon a platform 7 formed at the upper end of member 1 and cause the axial alignment of member 1 with respect to member 2 to be deflected in any direction merely by shifting his balance on the board. The position of the joint structure in a deflected position is shown in FIG. 1b and, from an analysis of FIGS. 1a and 1b, many of the advantages of this fluid bearing universal joint will be apparent. First of all, the axial load applied to member 1 pressurizes the fluid within the membrane 6 thereby transmitting the load to member 2. Since the membrane 6 is supported at all portions other than in the convolute, $d$, the only portions of the membrane 6 which are subject to tensile loads generated by the internal pressure are those in the unsupported portion across the convolute. Since the distance d can be made relatively small, it is possible to operate the joint with relatively high internal fluid pressures without requiring an extremely thick or heavily reinforced bladder. This results from the fact that the force that must be withstood by any portion of the membrane 6 is a function of not only the internal pressure but also of the membrane area across which the pressure acts. Thus, by decreasing the dimension $d$, the total tensile force that the membrane 6 must withstand can be maintained within reasonable limits; and in most applications of this invention even those experiencing extremely high internal pressures, it is possible to utilize state-of-the-art flexible diaphrams formed, for example, of such materials as rubber reinforced with nylon or glass fibers. Referring now to FIG. 1b, the joint is shown in its deflected position. It can be seen that the deformation of the joint to its deflected position occurs in a relatively frictionless manner in that there is no meaningful sliding motion between the membrane 6 and the walls of recess and the plug.

Also, ideally the deformation is such that the configuration of any vertical diametrical cross-section through the membrane 6, other than one perpendicular to the plane of the drawing shown, will be altered, but the area and perimeter of the cross-section will remain constant. In a plane perpendicular to the drawing shown, there will, of course, be no deformation of the membrane. In the absence of friction, there are two principal components of the force which must be overcome to deform the bladder. The first comprises the hysteresis forces required to physically deform the diaphram. The second component is the force required to push a mass of pressurized fluid from the downwardly directed edge of the deflected joint to the opposite side and maintain it there. As the right hand side of member 1 is deflected about the pivot point P, the portion of the membrane originally forming the convolute rolls off of the wall of plug 5 and onto the wall of the recess 3 without any noticeable sliding motion between the membrane 6 and the members 1 and 2. Thus, another portion of the membrane 6 now forms the convolute in the deflected condition and to illustrate this the portions of the membrane which previously formed the convolutes are shown in their new positions at d in FIG. 1b.

Figure 2A:
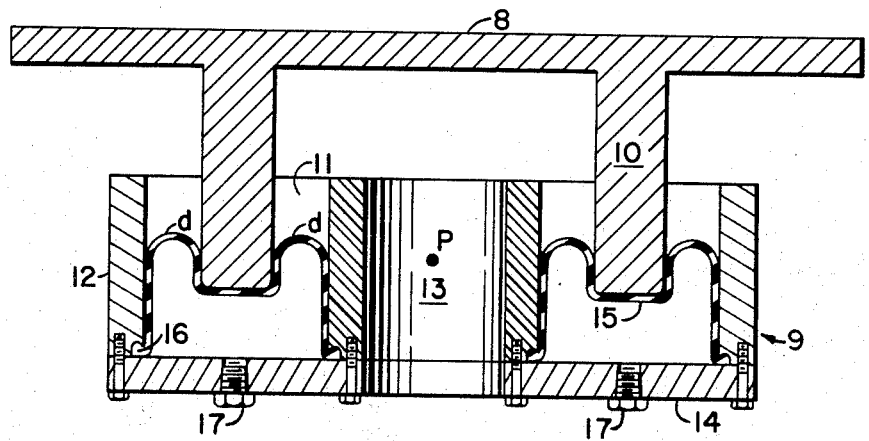
FIGS. 2a and 2b are side sectional views through another embodiment of this invention.
Figure 2B:
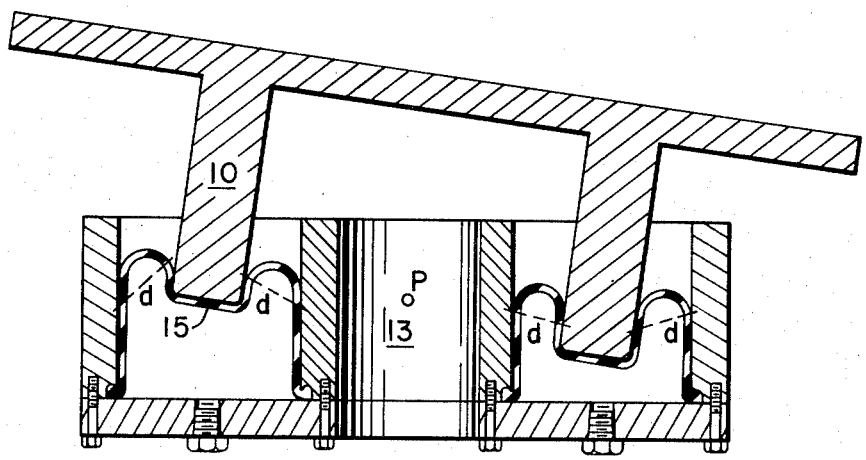

FIG. 2 illustrates an embodiment of this invention in which the central portion of the fluid is eliminated by providing each of the receptacle, the plug, and rolling seal means in annular form. This type of construction can be used as a balancing board type toy but is particularly useful where a lighter weight structure is required or where one or both of the connected members have hollow portions such as in flexible pipe joints, other flexible tubular connections, and in the reaction motor system described hereinafter. Referring now to FIG. 2, a cross-section through such an embodiment of the invention is illustrated. This embodiment of the invention comprises first and second members 8 and 9 respectively. Member 8 is provided with a depending annular plug 10 which is adapted to be received within annular receptacle 11 formed in member 9 by means of concentric annular walls 12 and 13 which may be bolted or otherwise affixed to the base 14 of member 9. Annular rolling seal means formed by convoluted membrane 15 are bolted in receptacle 11, the lower edges of membrane 15 being provided with reinforcing beads 16 which are clamped within grooves provided in the bases of wall members 12 and 13. Plug means 17 are provided in the base of member 14 to facilitate the charging of the volume defined between member 14 and membrane 15 with the fluid which completely fills this volume. As shown the membrane 15 is formed with convolutions d on both sides of plug 10 thereby providing rolling seal means between both the internal and external surfaces of both plug 10 and the annular receptacle 11. Assuming a similar mode of operation as that described with respect to the embodiment of FIG. 1, the configuration of the joint structure of FIG. 2a in the deflected position is shown in FIG. 2b with the relative displacement of the convolute being shown at d.

Figure 3A:
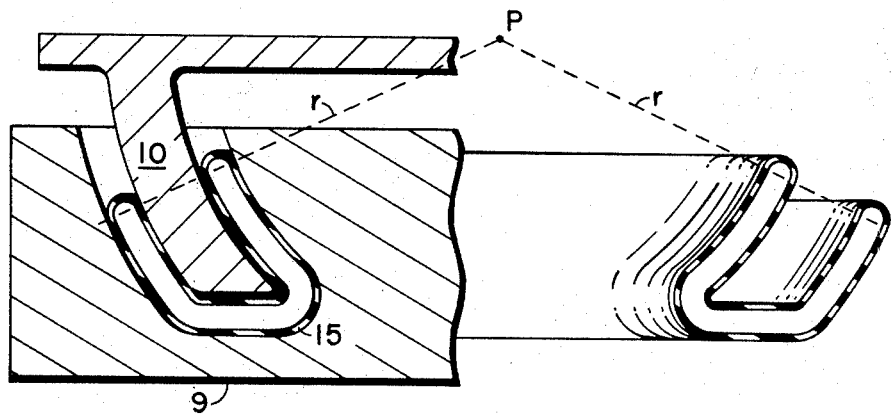
FIGS. 3a, 3b, and 3c are side views through other embodiments of rolling seal means according to this invention.
Figure 3B:
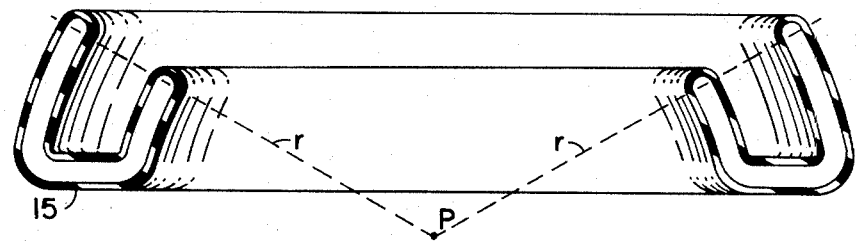
Figure 3C:
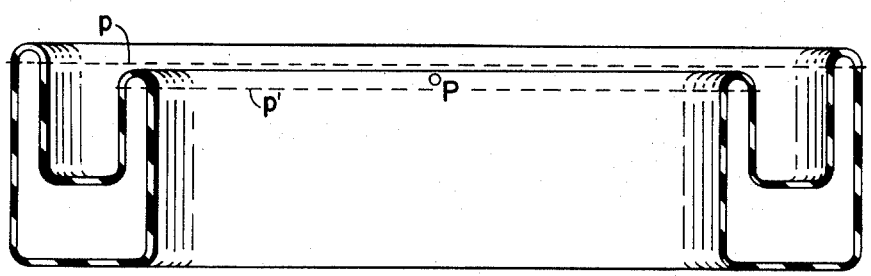

Referring now to FIGS. 3a – 3c, various arrangements of the convolutes of the annular rolling sealing means are shown and the effect of the convolute orientation upon the location of the pivot point will be described. The plug means and the receptacle walls are omitted in FIGS. 3b and 3c for clarity; it being understood that the rolling seal means are received and supported in an annular receptacle and has an annular plug member between the convolutes in the same general arrangement as shown in FIGS. 2 and 3a.

In FIGS. 3a and 3b, the structure of the joint means has been designed to produce rotation about the pivot points which are located above and below the plane of the base of each receptacle respectively.

Referring now to FIG. 3a, the fluid filled membrane 15, forming the rolling seal means at its convolutes, is received in an annular receptacle, the inner and outer surfaces of which are concentric spherical surfaces centered at P. The inner and outer surfaces of plug 10 similarly are concentric spherical surfaces also centered at P. The convolutes of membrane 15 are arranged such that they lie on the radial lines, r, all of which intersect at pivot point P. In FIG. 3a this point P is above the plane of member 9 whereas in FIG. 3b the pivot point would be below the plane of the base of the receptacle.

The joints of FIGS. 3a and 3b employ concentric spherical surfaces for the plug and receptacle which type construction may be preferred in many cases. However, the joint of this invention can also be operated with nonspherical surfaces such as shown in FIGS. 2 and 3c. In many applications in which the joint itself has a large diameter or in which the total angular deflection for which the joint is designed is low, straight walls may sufficiently approximate spherical walls over the design extremes as to not warrant the fabrication expense associated with forming the spherical surfaces. Also, if spherical surfaces are not employed, deflection of the joint will result in the generation of some shear stresses in the rolling seal membrane. These stresses will give the joint a neutral seeking capability tending to return the joint to its undeformed condition when the actuating force is removed. Accordingly, it would also require a greater actuating force to produce a given degree of rotation of the structure of FIG. 2 than of the structure of FIG. 3a, for example.

As was pointed out in FIGS. 3a and 3b, the pivot point for the joint was at the point of intersection of radial lines extending through the rolling seal convolutes. In FIGS. 2 and 3c, however, the joint structure does not have the spherical configuration of FIGS. 3a and 3b and the pivot point will not be as precisely located. Referring now to FIG. 2a, in the neutral position the seal convolutes are all in the same plane and the initial pivot point would be at the point P. Upon deflection, however, as shown in FIG. 2b, the effect of the distortion of the seal configuration is to prevent the convolutes from lying in precisely the same plane with the result that there will be rotation about the region shown as P rather than at a point P.

In FIG. 3c the effect of unequal convolute height is shown in that the higher convolute tends to rotate about a point in a plane p higher than the plane p' of the lower convolute. Since the joint cannot have two pivot points, the pivot position will be within the zone shown. Accordingly, some portions of the rolling seal membrane will be subject to tensile strain which will tend to produce a self restoring force. Similar results are also obtained if the inner convolute is made higher than the outer convolute or, in the case of the spherical arrangement of FIGS. 3a and 3b, if the inner and outer convolutes do not lie in the same radial line. These features permit a design flexibility in both location of the pivot point and the amount, if any, of restoring force developed.

Referring once more to the embodiments of FIGS. 2 and 3, it is quite apparent that relative angular axial deflection members 8 and 9 can be simply attained by tilting one of the members with respect to the other. This produces a substantially constant volume deformation of the membrane 15 in which the convolute portions roll off of one of the supporting surfaces and onto the opposite surface with an associated transportation of the fluid from one side of the joint to the other. While membrane 15 offers substantially no resistance to the rolling deformation experienced in the tilting of members 8 and 9, the membrane 15 is substantially resistant to the shear stresses which would occur if relative rotation or translation of these members is attempted with the membrane engaged with both members. The membrane may be maintained stationary with respect to members 8 and 9 either by friction or by direct connection. Thus, the joint may be used to transmit a torque between members 8 and 9 in the manner of a universal joint on a drive shaft. For torque transmitting purposes, it is desirable either to fasten both members to the membranes or to operate the joint with a predetermined axial compressive load on the members to produce a positive fluid pressure within the membrane means, or both.

Figure 4:
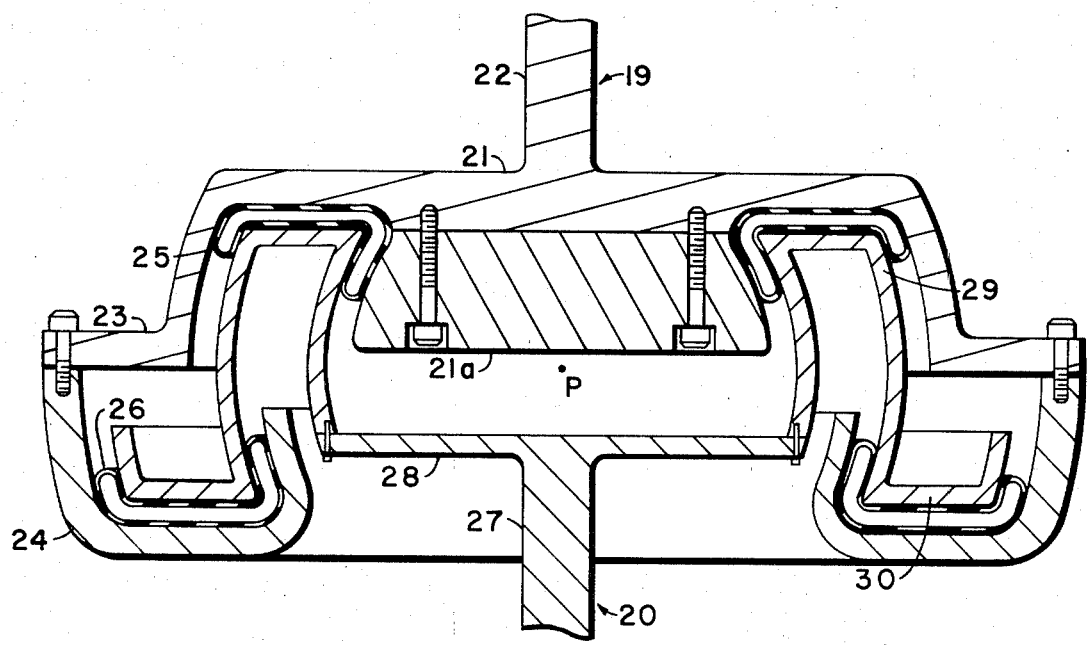
FIG. 4 is a side sectional view through another embodiment of this invention.

If a particular application requires the joint structure to withstand forces which will tend to both pull and push the two members apart or together at different times, it is possible to design a joint structure which will be capable of effectively resisting both of these forces. Such a joint structure is shown schematically in FIG. 4. According to the embodiment of FIG. 4, two axially deflectable members 19 and 20 are joined together by means of a double acting embodiment of this invention. This permits transmission of torque between two shafts pivoting about a point without any limitation on the direction or intensity of the axial loads on the shafts. Member 19 comprises a body portion 21 provided with an axially extending shaft 22. An annular recess having spherical sides centered at P is formed in the opposite face of member 19. The surface of member 19 radially beyond the recess is provided with a radially extending flange portion 23 from which depends an annular channel member also 24 having a spherical wall centered at P thereby defining an oppositely directed annular recess. Channel member 24 is affixed to flange 23 by bolts or other suitable means and base plate 21a is similarly affixed to body portion 21 to facilitate assembly of the device. Member 20 consists of a shaft portion 27, a base portion 28 and two oppositely directed radially spaced annular plug portions 29 and 30 having spherical surfaces also centered at P which are received with the recesses provided in member 19. Rolling seal means are formed between plugs 29 and 30 and the recess walls by the convoluted membranes 25 and 26. The volume confined behind the membranes 25 and 26 are filled with a substantially incompressible liquid by means of plugged ports (not shown). The ambient internal pressures of the liquid may be adjusted to any predetermined value. The convolutions of membrane 25 and membrane 26 are adjusted such that the pivot point for annular plug 29 is the same as the pivot point for annular plug 30, which as shown in FIG. 4 is point P.

In operation, any forces on members 19 and 20 which would tend to pull the members apart would be resisted by the fluid behind membrane 26 and these forces will be reacted by an increase of pressure behind this membrane. Similarly, any forces tending to push members 19 and 20 together will be reacted by the fluid behind membrane 25. Since both annular plug portions 29 and 30 have a common pivot point, the joint structure will be easily deformable to produce angular deflection about pivot point P in the same manner as the joints described in FIG. 2 and will be capable of transmitting torque from shaft 27 to shaft 22 or vice versa as a result of the static friction forces between the members 19 and 20 and the membranes 25 and 26 or by bonding or attaching the membranes to the members. Accordingly, a device such as that shown in FIG. 4 is particularly useful in any power transmission system in which it is required to transmit a torque between shafts angularly oriented such as in an angle drive for a power tool or in the drive train of a vehicle for example. It should be noted that members 19 and 20 can have various configurations and may be, for example, in annular form as in FIGS. 2 or 6 and the void volume utilized for fluid conveyance purposes or for the housing of a drive train apparatus.

Figure 5:
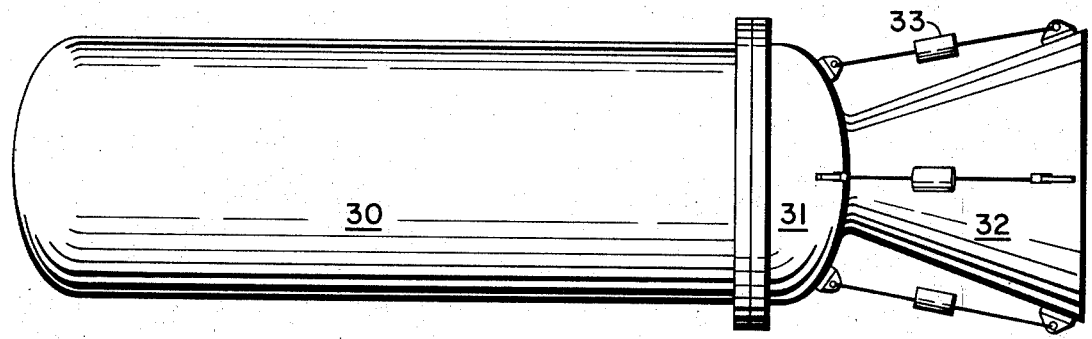
FIG. 5 is a side view of a movable nozzle rocket motor utilizing an embodiment of this invention.
Figure 6:
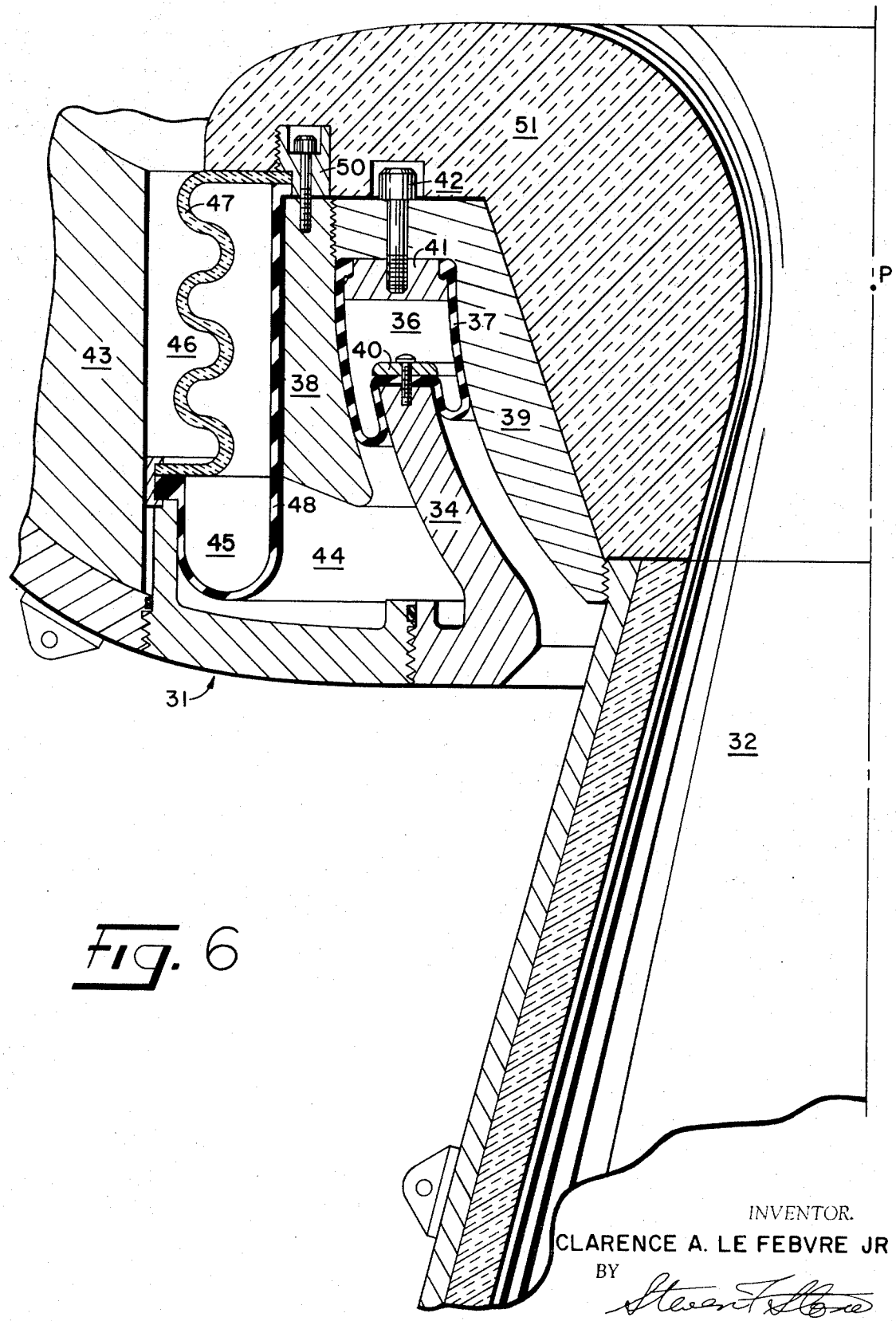
FIG. 6 is an axial sectional view of the aft end of the motor of FIG. 5.

Referring now to FIGS. 5 and 6, the use of the fluid supported membrane joint of this invention in connection with a movable nozzle reaction motor to provide a load bearing joint and seal between the movable nozzle and the motor is described. It is in this application that many of the unique properties of this invention find particular application as will be readily apparent from the following description. FIG. 5 is a general side view of a typical reaction motor having a movable nozzle. Such a motor may consist of a case section 30 containing the combustion chamber and an aft closure 31 which is affixed to case 30 and provides the support for a movable nozzle 32. The various positions of nozzle 32 can be adjusted through all quadrants as is known to the art by appropriate actuators 33 acting between the fixed nozzle support 31 and the movable nozzle 32. The particular method of actuating the movable nozzle is not critical with respect to this invention and while hydraulic actuators are illustrated, it is recognized that any method for producing a relative angular deflection of the movable nozzle with respect to the case is suitable and includes, without being limited to, liquid injection of a fluid into the exhaust gas stream to cause a localized pressure gradient within the nozzle or the use of jet tabs or jet vanes or the use of various types of hydraulic or mechanical or electrical actuators.

FIG. 6 is a cross-sectional view along an axial plane through the movable nozzle and case structure of FIG. 5 showing the internal details of the construction with the actuators 33 being omitted for clarity. Referring now to FIG. 6, the end closure structure is shown generally as 31 and is provided with an axial opening through which the movable nozzle assembly 32 passes. End closure 31 has an annular plug member 34 affixed thereto which is received in an annular recess 36 formed in the movable nozzle assembly 32. In some previous embodiments, the plug and recess walls have had surfaces which were in the form of concentric cylinders. Such a structure is satisfactory if the degree of angular deflection is small or if the radial distance from the rolling seal means to the pivot point is large or if a self-restoring force is desired. FIG. 6 illustrates an embodiment in which the surfaces of the plug 34 and receptacle 36 are sections of concentric spheres centered at the pivot point P. This permits the seal to function with a lower actuating force. It should be noted, however, that as the diameter of seal increases, the functional difference between a spherical surface and a cylindrical surface may become sufficiently minor as not to warrant the increased fabrication costs. When spherical surfaces are employed, a liquid should be used as the fluid since a relatively constant volume within membrane 36 is required to prevent binding of the spherical surfaces.

Annular rolling seal means are provided by convoluted fluid supported membrane 37 which forms a rolling seal between the annular plug member 34 and the walls of elements 38 and 39 which form recess 36. Membrane 37 is secured to plug 34 and element 39 by annular clamping plates 40 and 41, respectively, which are bolted to the structural members as shown. It is preferable that at least two diametrically opposite bolt holes in member 41 extend completely through member 41 to provide fluid communication with the inside of recess 36 to permit the filling of the recess with the fluid which is contained therein. After the volume within member 36 is filled, the ports would be sealed prior to final assembly. To provide adequate thermal insulation for the joint structure, a conventional insulating liner 43 is applied to the internal portion of the end support structure 31 and insulation of the movable nozzle joint is provided by a high temperature resistant grease placed in the volumes 44, 45 and 46 and maintained therein by means of flexible insulation such as graphite or silica cloths 47 and rubber sheets 48 respectively. Annular cap 50 is bolted to member 38 and is affixed to nozzle throat forming structure 51. It should be noted that insulation 47 and 48 does not act as the nozzle joint in the device shown but merely serves to provide a physical barrier to the heat generated in the combustion chamber.

Figure 7:
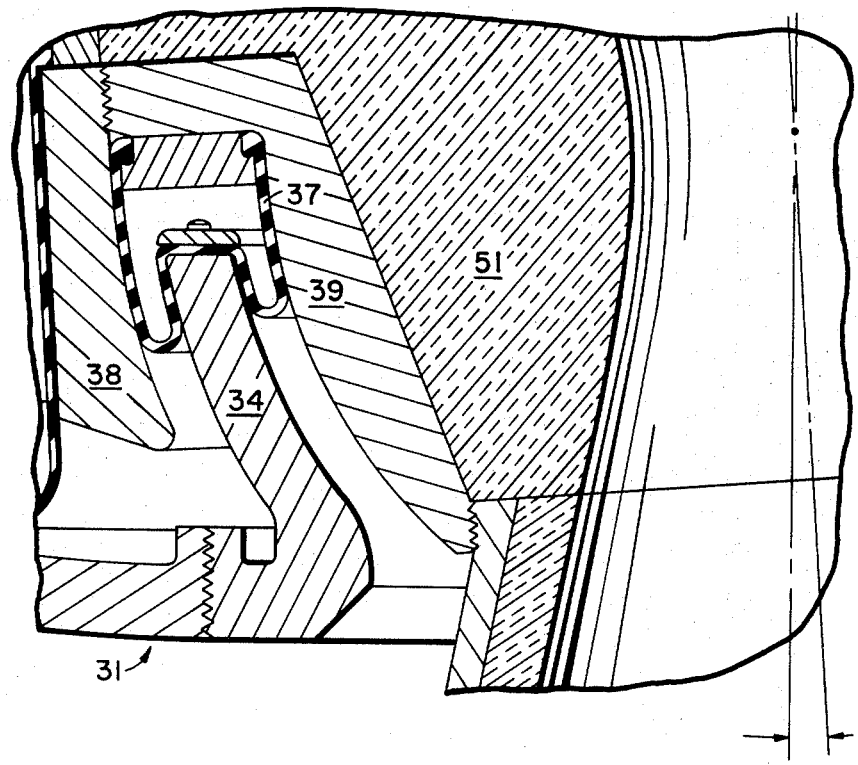
FIG. 7 illustrates portions of FIG. 6 showing the orientation of the components in a deflected position.

The use of a load bearing seal according to this invention produces several unique advantages in a movable nozzle support structure. First of all, by appropriate design of the receptacle and plug surfaces and the convolutions of the rolling seal means, it is possible to adjust the location of the pivot point of the movable nozzle; and as shown in FIG. 6, the pivot point is located at the throat of the nozzle. This location of the pivot point substantially reduces the actuating forces required to move the nozzle 32 as will be explained more fully below. Another advantage is that prior to use the joint may be stored with a negligible pressure within the membrane 37 which pressure would be due solely to the weight of the nozzle assembly. However, when the rocket motor is ignited and operating chamber pressure achieved, substantially all of the blow-off loads exerted on the nozzle 32 are transmitted to the nozzle support structure through the reaction pressure generated in the fluid in the recess 36. While the fluid within recess 36 may be at extremely high pressures, membrane 37 is supported at all surfaces other than at the convolutions. At the convolutions, however, the total area can be made relatively small thus permitting the use of a relatively thin, flexible reinforced rubber membrane as the sealing means. The net reaction pressure is reduced furthermore since the direction of the convolute forces subtract from the blow-off loads. When deflection of the nozzle 32 is required, the actuating means are appropriately adjusting causing the nozzle to pivot about the pivot point P. FIG. 7 shows the relative positions of members 38, 39, 34 and 37 in a 6° axial deflection to the left. As can be seen, the major change that occurs is that the cross-sectional configuration of the membrane and locations of the convolutions along membrane 37 are altered. The section of the membrane shown is on the side towards the deflection and the enclosed area of this section has decreased with the convolution being formed further towards the base of plug 34 than in the nondeformed condition. At the opposite point on the seal, of course, the enclosed area has increased by this same amount and the convolutions will be formed further away from the base of plug 34. The altered configuration of the convolutes occurs in the rolling, substantially frictionless manner previously described. Thus, the only forces required in the deformation of the joint associated with the tilting of nozzle 32 are the forces necessary to move a small mass of fluid from the left side of the joint shown to the other as well as the hysteresis forces required to rollably deform portions of membrane both of which can be made relatively nominal. For example, by maintaining the convolute width small, a thin membrane may be used which will reduce hysteresis forces. If a structure similar to that of FIG. 2 was employed, an additional component of force would be that associated with shear deformation of the membrane which would also tend to exert an equal restoring force on the system. The joint structure itself is substantially resistant to relative rotation of members 32 and 31 since the membrane 37 has substantial resistance to shear.

During operation of the motor, the force actually required to cause a relative tilting of a movable nozzle with respect to a fixed support consists of two major components. The first component is that discussed above, namely the forces associated with the deformation of the fluid supported membrane. The other component which must be considered, and which in many applications constitutes a substantial component, is the aerodynamic force produced on the movable nozzle when the axis of the nozzle is angularly deflected with respect to the axis of the reaction motor. Such a deflection causes a change in direction of a large mass of high velocity exhaust gases which exerts a force on nozzle 32. The moment produced by this force is equivalent to the force multiplied by the distance between the nozzle throat, where such forces can be considered to be concentrated, and the pivot point of the nozzle. In FIG. 6 the pivot point P is located near the nozzle throat and as a result the total moment produced by the aerodynamic load is substantially eliminated. In a similar manner, inertia torque can be reduced by locating the pivot point near the center of the mass of the movable assembly. In FIG. 6, the actuator need not overcome any significant aerodynamic moment and the tilting of nozzle 32 results only in a sidewards force exerted on the nozzle. Negligible lateral displacement of the axis of the movable nozzle occurs, however, since any such lateral displacement will be resisted by shear stresses and tensile forces generated in the membrane as well as by forces generated by the action of the uniform internal pressure on the altered nonuniform convolution configuration produced by any tendency towards lateral axial translation. As a result of the relatively low forces required to deform the joint, together with the reduced aerodynamic moment, the power requirements for the actuating means need to produce an angular deflection of the axis of nozzle 32 can be substantially reduced.

Figure 8:
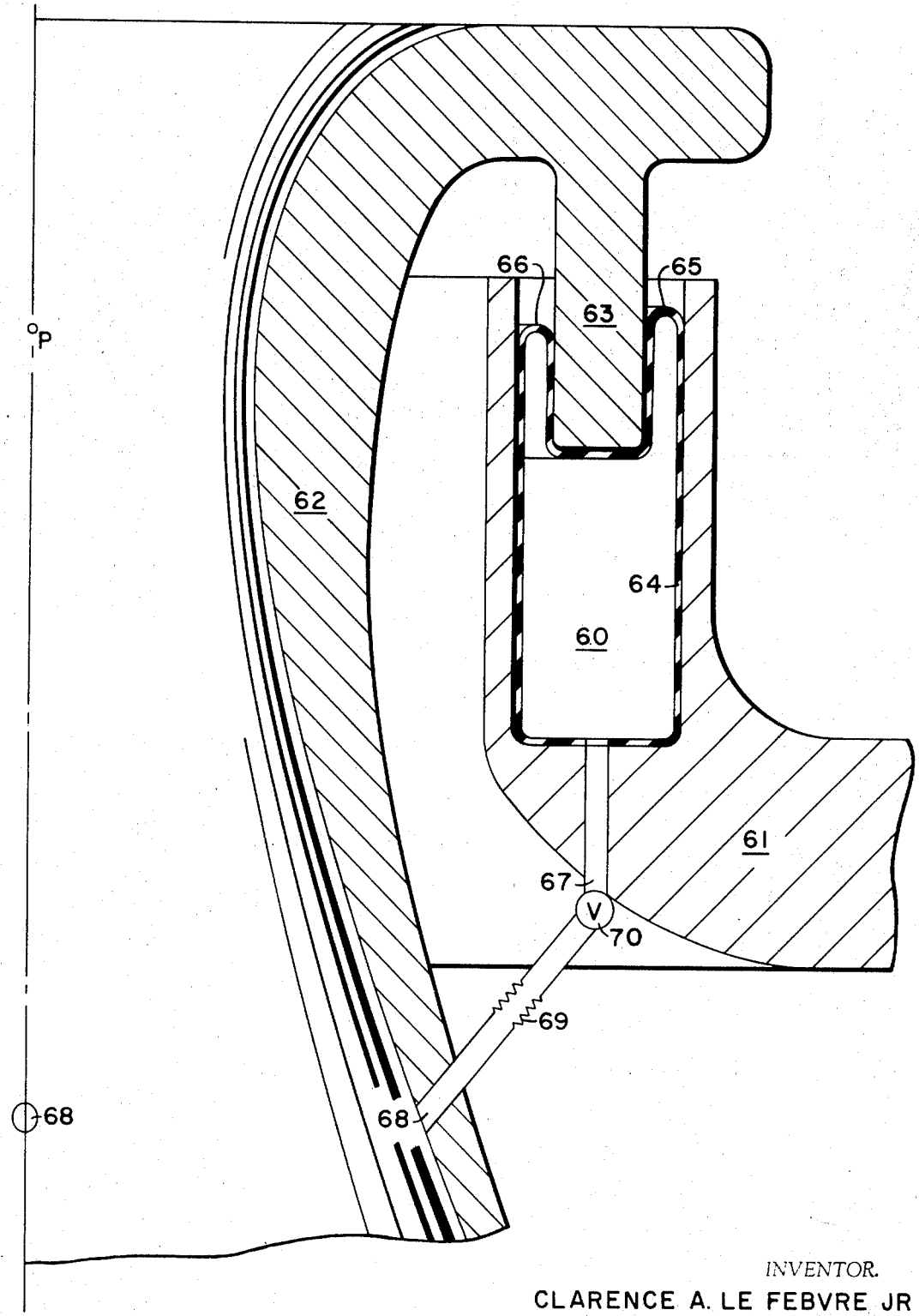
FIG. 8 is a sectional view of another embodiment of a movable nozzle joint according to this invention.

While the embodiments of the invention shown in FIGS. 6 and 7 utilize a structure in which the recess was formed in the movable nozzle assembly and the annular plug means was formed on the fixed nozzle support, it is obvious that the reverse arrangement can also be employed. Referring now to FIG. 8, this embodiment of the invention comprises a recess 60 formed in the inner portion of the aft closure 61 of a rocket motor. The movable nozzle 62 extends through an axial port in member 61 and is provided with depending plug means 63 which are received in recess 60 and separated from the wall thereof by means of a rolling seal membrane 64 having convolutions 65 and 66 adjusted such that the pivot point is in the region of the throat of nozzle 62 as shown at P. Membrane 65 is preferably bonded or otherwise affixed to members 61 and 63 in order to prevent the membrane from being extruded from the recess as a result of the $\Delta P$ encountered during operation being greater across convolute 66, which is exposed to ambient pressures, than across convolute 65, which is exposed to combustion chamber pressure. In this embodiment, the recess 60 is substantially larger than in preceeding volumes to provide a large reservoir of liquid within bladder 64. This liquid will be pressurized by the blow off and side loads produced on nozzle 62 during operation. While conventional mechanical, electrical, or hydraulic actuators can be used to actuate this embodiment of the invention, it is also possible to provide actuation of nozzle 62 by fluid injection techniques normally used to produce thrust vector control in nonmovable nozzle systems. For example, by providing a port 67 in member 61 in fluid communication with the interior of recess 60 and by connecting such ports to ports 68, equally spaced about nozzle 62 through flexible lines 69 or appropriate manifolding and servoactuated valves 70, it is possible to utilize recess 60 as a reservoir for the actuation fluid thereby eliminating the need to carry any substantial amounts of extra fluid. Since the actuating forces required to cause movement of nozzle 62 are substantially less than those obtained with existing devices, in many instances it will be possible to have an adequate reservoir of fluid to meet all control needs of a particular system within the volume defined within bladder 64. The fluid injected through one or more ports 68 will cause a localized pressure increase in the exhaust gas stream in the vicinity of a port through which the fluid is injected. The force created by this ΔP will cause the nozzle 62 to pivot around zone P. If the pivot zone P is downstream from the throat, the aerodynamic forces will create a moment opposite to that produced by the injectant. This will tend to return the nozzle to neutral position when injection is stopped. In other situations, a positive restoration to neutral will be required and obtained either by designing the seal to produce a restoring force or by appropriate injection of fluid or both.

EXAMPLE

Apparatus such as described herein having the pivot point in nozzle throat area was employed as the nozzle joint and seal for a rocket motor. A rolling seal diaphram with an O. D. of 8.875 inches and an I. D. of 6.125 inches was formed of rubber reinforced nylon fabric having a total thickness of 0.093 inches. The width of each convolute was approximately 0.33 inches. The fluid employed was a silicone oil. The motor was fired at 555 psi chamber pressure producing about 1,000 pounds of thrust and the nozzle was deflected in different directions up to 6°. The pressure within the seal during operation was about 1075 psi and was successfully resisted by the membrane.

While this invention has been disclosed with respect to several embodiments thereof, it should not be construed as being limited thereto. Various modifications will be obvious to workers skilled in the art and can be made without departing from the scope of this invention which is only limited by the following claims wherein:

I claim:

1. In a movable nozzle reaction motor comprising, a combustion chamber, a nozzle support structure, a movable nozzle assembly, joint means for supporting said movable nozzle assembly on said fixed nozzle support means and means for angularly deflecting the axis of said movable nozzle means with respect to the axis of said reaction motor, the improvement wherein said joint means comprises:
   a. annular plug means formed on one of said nozzle support structure and movable nozzle assembly,
   b. annular receptacle means formed on the other of said fixed nozzle support and movable nozzle assembly, said plug means being received in said receptacle means in spaced apart relationship therefrom,
   c. rolling seal means disposed between said plug means and receptacle means and defining a volume therebetween, and
   d. a fluid filling volume.

2. The reaction motor of claim 1 wherein said fluid is substantially incompressible liquid.

3. A movable nozzle system comprising, in combination:
   a. a first member comprising a nozzle support structure,
   b. a second member comprising a movable nozzle assembly,
   c. annular receptacle means formed on one of said members,
   d. annular plug means formed on the other of said members and received within said receptacle means,
   e. fluid supported flexible membrane means disposed within said receptacle means maintaining the adjacent surfaces of said plug means and receptacle means in spaced apart relationship, said membrane being formed, in the space between adjacent side surface of said plug and receptacle means, into reentrant convolutes.

4. The system of claim 3 wherein said fluid is a substantially incompressible liquid.

5. The system of claim 3 further comprising means for angularly deflecting the axis of said first member with respect to the axis of said second member.

6. The assembly of claim 4 further comprising means for angularly deflecting the axis of said first member with respect to the axis of said second member.

7. A movable nozzle assembly for obtaining relative angular deflection of the axis of a reaction motor nozzle and the axis of a reaction motor comprising:
   a. movable nozzle means,
   b. support means for said movable nozzle means, and
   c. load bearing means for transmitting loads on said movable nozzle means to said nozzle support means, said load bearing means comprising fluid supported membrane means disposed between said nozzle means and said support means and forming rolling seal means between the portions of the surfaces of said nozzle means and support means which undergo relative translational motion during angular deflection of the axis of said nozzle means.

8. The nozzle assembly of claim 7 wherein said fluid supported membrane means maintains adjacent surfaces of said nozzle means and support means in spaced apart relationship.

9. The nozzle assembly of claim 8 further comprises means affixing said membrane means to each of said nozzle means and support means whereby relative rotation of said nozzle means and support means is prevented.

10. The movable nozzle assembly of claim 9 wherein the volume of fluid supporting said fluid supported membrane remains substantially constant upon angular deflection of said nozzle means and support means.

11. The apparatus of claim 1 wherein the mass of fluid in said volume in the deflected condition is substantially equal to the mass of fluid in said volume in the nondeflected condition and all intermediate conditions.

12. The movable nozzle assembly of claim 9 wherein the mass of fluid supporting said fluid supported membrane remains substantially constant upon angular deflection of said nozzle means and support means.

13. In a movable nozzle reaction motor comprising, a combustion chamber, a nozzle support structure, a movable nozzle assembly, joint means for supporting said movable nozzle assembly on said fixed nozzle support means and means for angularly deflecting the axis of said movable nozzle means with respect to the axis of said reaction motor, the improvement wherein said joint means comprises:
   a. plug means formed on one of said nozzle support structure and movable nozzle assembly,
   b. receptacle means formed on the other of said fixed nozzle support and movable nozzle assembly, said plug means being received in said receptacle means in spaced apart relationship therefrom,
   c. rolling seal means disposed between said plug means and receptacle means and defining a volume therebetween, and
   d. a fluid filling said volume.

14. A movable nozzle system comprising, in combination:
   a. a first member comprising a nozzle support structure,
   b. a second member comprising a movable nozzle assembly,
   c. receptacle means formed on one of said members,
   d. plug means formed on the other of said members and received within said receptacle means, and
   e. fluid supported flexible membrane means disposed within said receptacle means maintaining the adjacent surfaces of said plug means and receptacle means in spaced apart relationship, said membrane being formed, in the space between adjacent sides of said plug and receptacle means, into reentrant convolutes.

15. A movable nozzle system for a reaction motor comprising in combination:
   a. a first member comprising a nozzle support structure,
   b. a second member comprising a movable nozzle assembly,
   c. receptacle means formed on one of said members and disposed about the axis of said movable nozzle assembly,
   d. plug means formed on the other of said members and received within said receptacle, the surfaces of said plug means being spaced apart from the surfaces of said said receptacle means,
   e. membrane means disposed in fluid retaining relationship between said plug means and said receptacle means, said membrane having convolutes of at least 90° between the outer surface of said plug means and the adjacent surface of said receptacle means and between the inner surface of said plug means and the adjacent surface of said receptacle means, and
   f. a fluid in the volume between said plug means and receptacle means and maintained therein by said membrane means.

16. The system of claim 15 further comprising means for angularly deflecting the axis of said first member with respect to the axis of said second member.

17. The system of claim 16 wherein said fluid is substantially incompressible.

18. The system of claim 16 wherein each said convolute extends through at approximately 180°.

* * * * *

UNITED STATES PATENT OFFICE
CERTIFICATE OF CORRECTION

Patent No. 3,698,192    Dated October 17, 1972

Inventor(s) Clarence A. LeFebvre

It is certified that error appears in the above-identified patent and that said Letters Patent are hereby corrected as shown below:

Column 9, line 29, "adjusting" should read---adjusted---. Column 9, line 32, "left" should---right---. Column 9, line 36, "towards" should read---away from---. Column 14, line 32, "through at approximately 180°" should read---through approximately 180°.---.

Signed and sealed this 13th day of March 1973.

(SEAL)
Attest:

EDWARD M. FLETCHER, JR.                ROBERT GOTTSCHALK
Attesting Officer                       Commissioner of Patents